(12) United States Patent
Niblock

(10) Patent No.: US 9,272,571 B2
(45) Date of Patent: Mar. 1, 2016

(54) DRIVE WHEEL ASSEMBLY FOR SELF-PROPELLED IRRIGATION SYSTEM

(71) Applicant: Tommy No Trax, LLC, Colby, KS (US)

(72) Inventor: Paul H Niblock, Colby, KS (US)

(73) Assignee: Tommy No Trax, LLC, Colby, KS (US)

(*) Notice: Subject to any disclaimer, the term of this patent is extended or adjusted under 35 U.S.C. 154(b) by 79 days.

(21) Appl. No.: 14/191,727

(22) Filed: Feb. 27, 2014

(65) Prior Publication Data
US 2015/0239288 A1   Aug. 27, 2015

(51) Int. Cl.
*B60B 15/22* (2006.01)

(52) U.S. Cl.
CPC .......... *B60B 15/22* (2013.01); *B60B 2900/112* (2013.01); *B60B 2900/113* (2013.01); *B60B 2900/115* (2013.01)

(58) Field of Classification Search
CPC ............................................ B60B 15/18–15/20
USPC ..................... 301/43–44.4; 305/4, 5
See application file for complete search history.

(56) References Cited

U.S. PATENT DOCUMENTS

| | | | | |
|---|---|---|---|---|
| 788,504 | A | * | 4/1905 | Green ................................. 305/5 |
| 856,259 | A | * | 6/1907 | Jones ................................. 305/2 |
| 975,117 | A | * | 11/1910 | Bower ............................... 305/5 |
| 1,038,103 | A | | 9/1912 | Erbes |
| 1,310,746 | A | * | 7/1919 | Firestone .......................... 305/4 |
| 1,348,070 | A | * | 7/1920 | Whitaker ......................... 305/3 |
| 1,439,847 | A | * | 12/1922 | Slauson ............................ 305/4 |
| 1,441,303 | A | * | 1/1923 | Slauson ............................ 305/4 |
| 1,486,597 | A | * | 3/1924 | Miller ............................ 301/39.1 |
| 1,554,333 | A | * | 9/1925 | Carlson ............................ 305/3 |
| 1,565,757 | A | * | 12/1925 | Slauson ............................ 305/4 |
| 1,586,931 | A | | 6/1926 | Wine |
| 1,594,257 | A | * | 7/1926 | Guerrini .......................... 305/4 |
| 1,620,460 | A | * | 3/1927 | Guerrini ........................ 305/45 |
| 1,634,683 | A | | 7/1927 | Probst |
| 1,666,036 | A | * | 4/1928 | Wine ............................... 305/4 |
| 1,705,796 | A | * | 3/1929 | Wine .............................. 301/46 |
| 1,715,881 | A | * | 6/1929 | Wine ....................... 29/894.351 |
| 1,721,769 | A | * | 7/1929 | Campodonico ................... 305/2 |
| 1,754,569 | A | * | 4/1930 | Passega ........................... 305/4 |
| 1,793,985 | A | * | 2/1931 | Wine et al. ....................... 305/4 |
| 1,800,600 | A | * | 4/1931 | Campodonico ................... 305/5 |
| 1,840,779 | A | * | 1/1932 | Johnston ........................ 305/19 |
| 1,901,544 | A | * | 3/1933 | Welsford .......................... 305/4 |
| 1,921,537 | A | * | 8/1933 | Osman et al. .................... 305/5 |

(Continued)

*Primary Examiner* — Jeffrey J Restifo
*Assistant Examiner* — Erez Gurari
(74) *Attorney, Agent, or Firm* — Jeffrey L. Thompson; Thompson & Thompson PA

(57) ABSTRACT

A drive wheel attachment for a self-propelled irrigation system includes an annular-shaped clamping band assembly having multiple sections that fit around and clamp to existing wheel rims. A plurality of circumferentially spaced, radially extending structures are secured to and extend radially outwardly from the clamping band assembly. A plurality of foot assemblies are attached to the radially extending structures. Each foot assembly includes a first hinge sleeve removably attached to a respective one of the radially extending structures, and a ground engaging foot pad pivotally attached to the first hinge sleeve by a pair of second hinge sleeves and a pivot pin extending through the first and second hinge sleeves. The pivot pin is fixed to the second hinge sleeves and allows rocking movement of the foot pad relative to the radially extending structure about a pivot axis that extends generally parallel to an axial direction of the wheel rim.

19 Claims, 6 Drawing Sheets

(56) References Cited

U.S. PATENT DOCUMENTS

| | | | |
|---|---|---|---|
| 2,146,175 A * | 2/1939 | Dillingham | 305/5 |
| 2,332,037 A * | 10/1943 | Wine | 303/54 |
| 2,335,372 A * | 11/1943 | Wine | 305/4 |
| 2,383,282 A * | 8/1945 | Wine | 301/56 |
| 5,380,075 A * | 1/1995 | Haws | 305/5 |
| 5,451,001 A * | 9/1995 | Kumm | 239/726 |
| 5,865,916 A | 2/1999 | Woolley | |
| 7,775,610 B2 * | 8/2010 | Mettenbrink | 305/4 |
| 8,657,215 B1 * | 2/2014 | Blum | 239/726 |
| 2004/0089385 A1 * | 5/2004 | Kahen | 152/185 |
| 2011/0121090 A1 | 5/2011 | Price | |

\* cited by examiner

DRIVE WHEEL ASSEMBLY FOR SELF-PROPELLED IRRIGATION SYSTEM

BACKGROUND OF THE INVENTION

1. Field of the Invention

The present invention relates generally to self-propelled irrigation systems, and more particularly, to an improved drive wheel assembly for a self-propelled irrigation system.

2. Description of the Prior Art

Self-propelled irrigation systems are used to provide water for agricultural purposes in arid regions. Typically, such systems include a series of spaced drive towers connected by truss sections that support a water distribution pipeline between the towers. In center pivot systems, the water distribution pipeline extends radially from a central pivot connected to a water supply. In linear move irrigation systems, the water distribution pipeline extends laterally from a canal feed or hose drag system that provides the water supply.

Water passing through the distribution pipeline is forced out through a number of sprinkler heads, spray guns, drop nozzles, or the like spaced along the length of the pipeline. Each drive tower in the system is supported on wheels that are driven at slow speeds to move the tower in a circular path about the central pivot, or a linear path in the case of linear move systems, to thereby irrigate a large tract of land.

Conventional drive towers for self-propelled irrigation systems are each supported by a base beam that extends transverse to the distribution pipeline with a drive wheel assembly at each end of the base beam. The drive wheel assemblies typically include a metal wheel rim with a rubber tire with lug tread mounted on the wheel rim. The weight of the drive tower and the corresponding part of the water pipeline is approximately evenly distributed between the two drive wheel assemblies. However, in difficult terrain drive towers sometimes become stuck or leave deep ruts in the field, which are undesirable.

There have been many attempts in the prior art to improve the flotation and traction of drive wheels used with self-propelled irrigation systems. For example, U.S. Pat. No. 7,775,610 issued to Mettenbrink discloses a flotation drive wheel that has a plurality of pivotal flotation shoes attached to a heavy metal hub portion. However, Mettenbrink's wheel is expensive to manufacture, cannot be mounted as an attachment to existing wheel rims, and does not allow convenient replacement of wear parts.

There is a need in the industry for an improved drive wheel assembly for self-propelled irrigation systems.

SUMMARY OF THE INVENTION

An object of the present invention is to provide an improved drive wheel assembly for self-propelled irrigation systems that provides better traction and flotation than conventional rubber tired wheel assemblies, and that reduces the amount of soil displaced to either side of the wheel track.

A further object of the present invention is to provide a drive wheel assembly that can be mounted to and used with existing wheel rims in place of rubber tires.

A further object of the present invention is to provide a drive wheel assembly that is relatively inexpensive to manufacture, that concentrates the primary wear points on parts that can be replaced efficiently and inexpensively, and that is capable of a long operating life.

To accomplish these and other objects of the present invention, a drive wheel attachment is provided for self-propelled irrigation systems that has an annular-shaped clamping band assembly with multiple sections that fit around and clamp to existing wheel rims. A plurality of circumferentially spaced, radially extending structures are secured to and extend radially outwardly from the clamping band assembly. A plurality of foot assemblies are attached to the radially extending structures. Each foot assembly includes a first hinge sleeve removably attached to a respective one of the radially extending structures, and a ground engaging foot pad pivotally attached to the first hinge sleeve by a pair of second hinge sleeves and a pivot pin extending through the first and second hinge sleeves. The pivot pin is fixed to the second hinge sleeves and allows rocking movement of the foot pad relative to the radially extending structure about a pivot axis that extends generally parallel to an axial direction of the wheel rim.

According to one aspect of the present invention, a drive wheel attachment for a self-propelled irrigation system is provided, comprising: an annular-shaped clamping band assembly having multiple sections adapted to fit around a wheel rim, and at least one threaded fastener for drawing together the multiple sections for clamping the clamping band assembly to the wheel rim; a plurality of circumferentially spaced, radially extending structures secured to and extending radially outwardly from the clamping band assembly; and a plurality of foot pads, each foot pad pivotally attached intermediate its length to a respective one of the radially extending structures for allowing rocking movement of the foot pad relative to the radially extending structure about a pivot axis extending generally parallel to an axial direction of the wheel rim.

According to another aspect of the present invention, a drive wheel attachment for a self-propelled irrigation system is provided, comprising: an inner portion; a plurality of circumferentially spaced, radially extending structures secured to and extending radially outwardly from the inner portion, the radially extending structures each having an inner end secured to the inner portion and a first mounting plate spaced radially outwardly from the inner portion; and a plurality of foot assemblies, each foot assembly being attached to a respective one of the radially extending structures. Each foot assembly comprises: a first hinge sleeve removably attached to a respective one of the first mounting plates; a foot pad having an outer surface for engaging the ground and a mounting structure on a backside, the mounting structure comprising a pair of second hinge sleeves arranged intermediate a length of the foot pad, the second hinge sleeves being axially spaced apart to receive the first hinge sleeve therebetween; and a removable pivot pin extending through the first hinge sleeve and the second hinge sleeves that allows rocking movement of the foot pad relative to the radially extending structure about a pivot axis extending in an axial direction of the wheel.

According to another aspect of the present invention, a drive wheel assembly for a self-propelled irrigation system is provided, comprising: a wheel rim adapted to be attached to a wheel hub; an annular-shaped clamping band assembly having multiple sections that fit around the wheel rim, and at least one threaded fastener arranged to draw together the multiple sections to clamp the clamping band assembly to the wheel rim; a plurality of circumferentially spaced, radially extending structures secured to and extending radially outwardly from the clamping band assembly; and a plurality of foot pads, each foot pad pivotally attached intermediate its length to a respective one of the radially extending structures for allowing rocking movement of the foot pad relative to the radially extending structure about a pivot axis extending generally parallel to an axial direction of the wheel rim.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A drive wheel assembly for a self-propelled irrigation system according to the present invention will now be described with reference to FIGS. 1 to 7 of the accompanying drawings.

Figure 1:
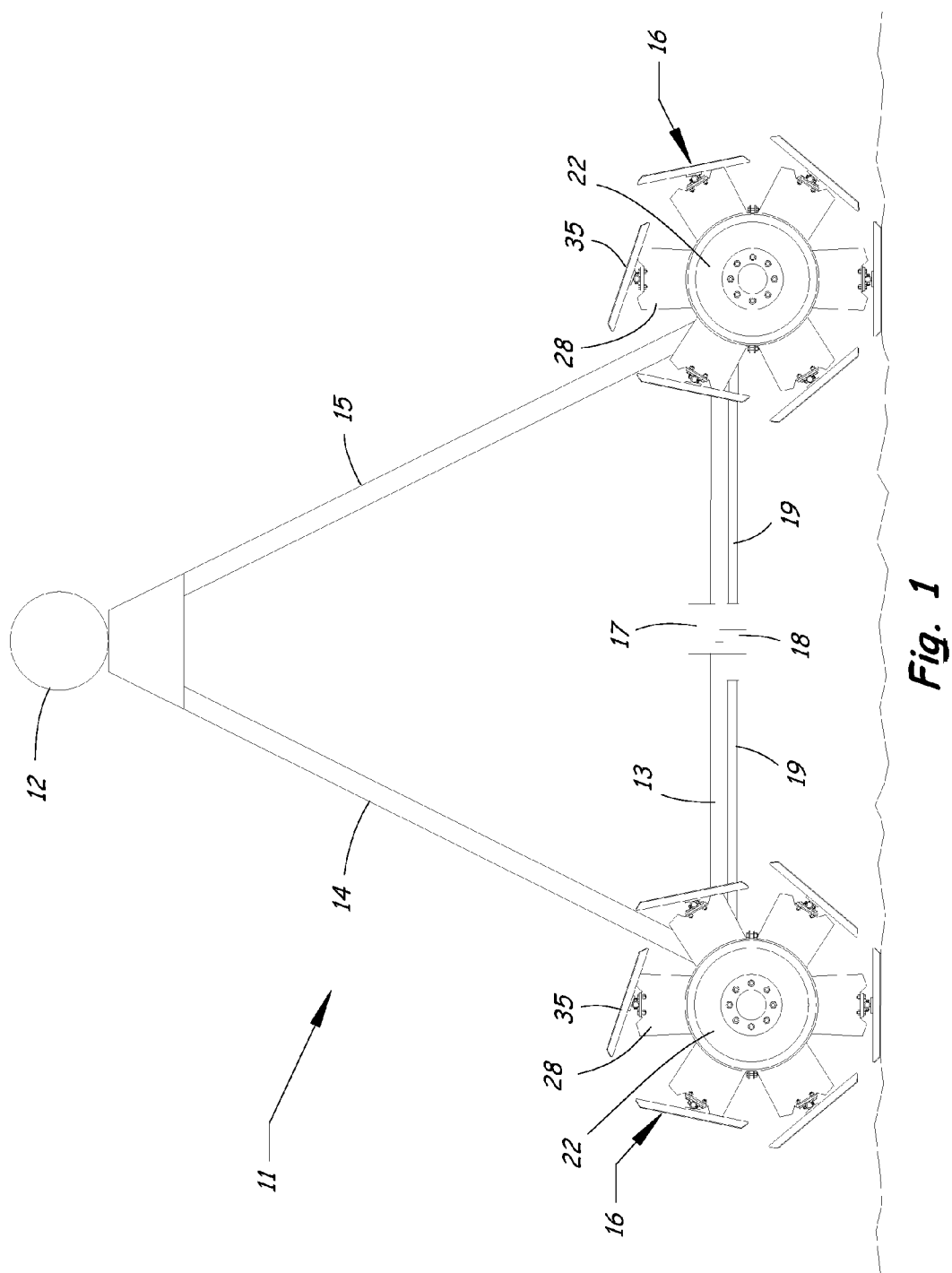
FIG. 1 is an elevation view of a support tower for a self-propelled irrigation system equipped with drive wheel assemblies according to the present invention.

A drive tower 11 of a self-propelled irrigation is illustrated in FIG. 1. The drive tower 11 supports a water distribution pipeline 12 above a field in a known manner. The irrigation system can be a center pivot system in which the pipeline 12 is connected to a fixed center pivot at the center of a field, a linear move system in which the pipeline 12 is carried across a field in a linear manner without a fixed center pivot point, or a corner system in which the drive tower 11 follows a predetermined path through the field. Irrigation water is supplied through the pipeline 12 to a plurality of sprinkler nozzles spaced along the length of the pipeline for applying water to the field in a known manner.

The drive tower 11 includes a base beam 13, first and second tower members 14, 15 extending upwardly and inwardly from respective ends of the base beam 13 to converge at the water pipeline 12, and a drive wheel assembly 16 at each end of the base beam 13 for supporting and propelling the drive tower 11 over a field. The drive wheel assemblies 16 can be driven by a center drive electric motor 17 and associated gear boxes 18 and drive shafts 19, or other conventional drive means, such as hydraulically driven motors associated with each drive wheel. The drive wheel assemblies 16 are driven at a relatively slow speed (e.g., 5 to 15 feet per minute) so that irrigation water can be applied at an appropriate rate that allows the water to soak into the field to make the most efficient use of the water and the irrigation equipment. The slow speed of the drive wheel assemblies 16 and simultaneous application of irrigation water often results in the drive wheel assemblies 16 operating in extremely muddy conditions.

The drive wheel assembly 16 of the present invention provides a drive wheel attachment 20 with an inner portion 21 that fits over a conventional wheel rim 22 in place of a rubber tire found on most existing self-propelled sprinklers, without altering the wheel rim 22. The inner portion 21 of the drive wheel attachment 20 includes an annular-shaped clamping band assembly having first and second sections 23, 24 each with a substantially semi-circular shape. Flanges 25 are provided at each end of the first and second sections 23, 24. A plurality of holes 26 are formed in the flanges 25. A plurality of threaded fasteners 27 extend through the holes 26 in the flanges 25 to draw the first and second sections 23, 24 together to clamp around the wheel rim 22.

Alternatively, the clamping band assembly can be provided in more than two sections (e.g., 3 to 6 sections) that are fit over a wheel rim 22 and clamped together using a similar arrangement of flanges and threaded fasteners.

Figure 2:
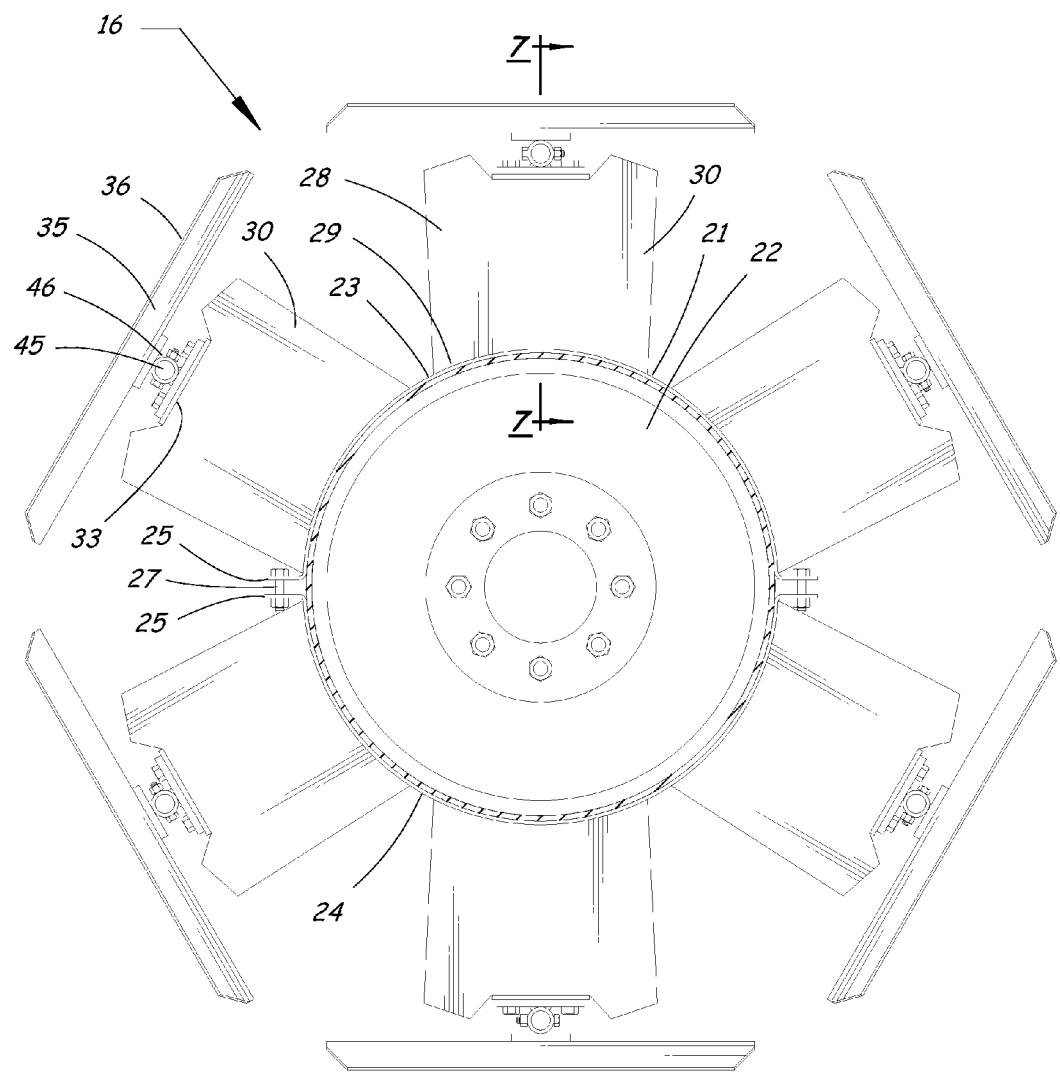
FIG. 2 is an elevation view of a drive wheel assembly according to the present invention.
Figure 3:
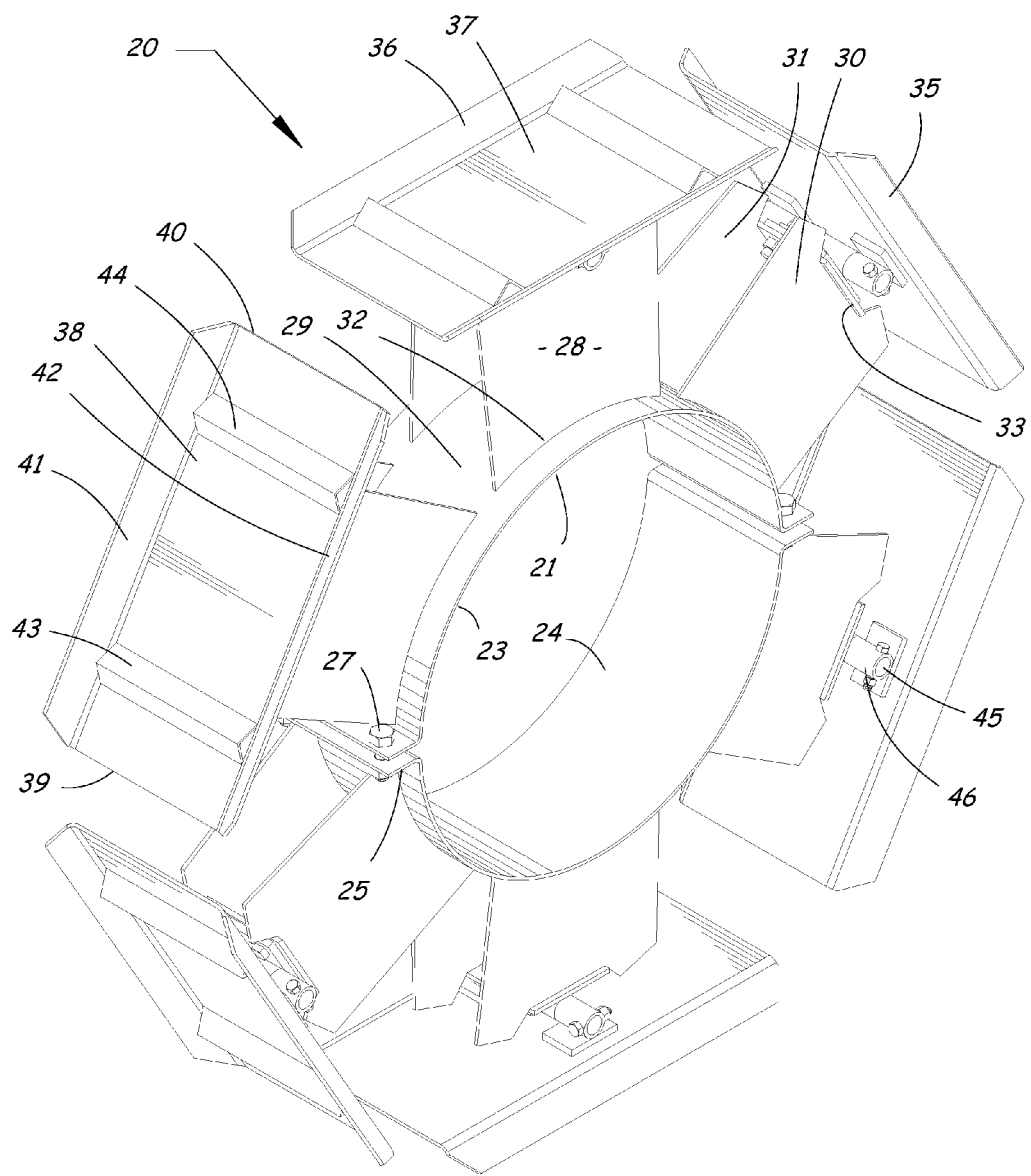
FIG. 3 is a perspective view of a drive wheel attachment according to the present invention.
Figure 4:
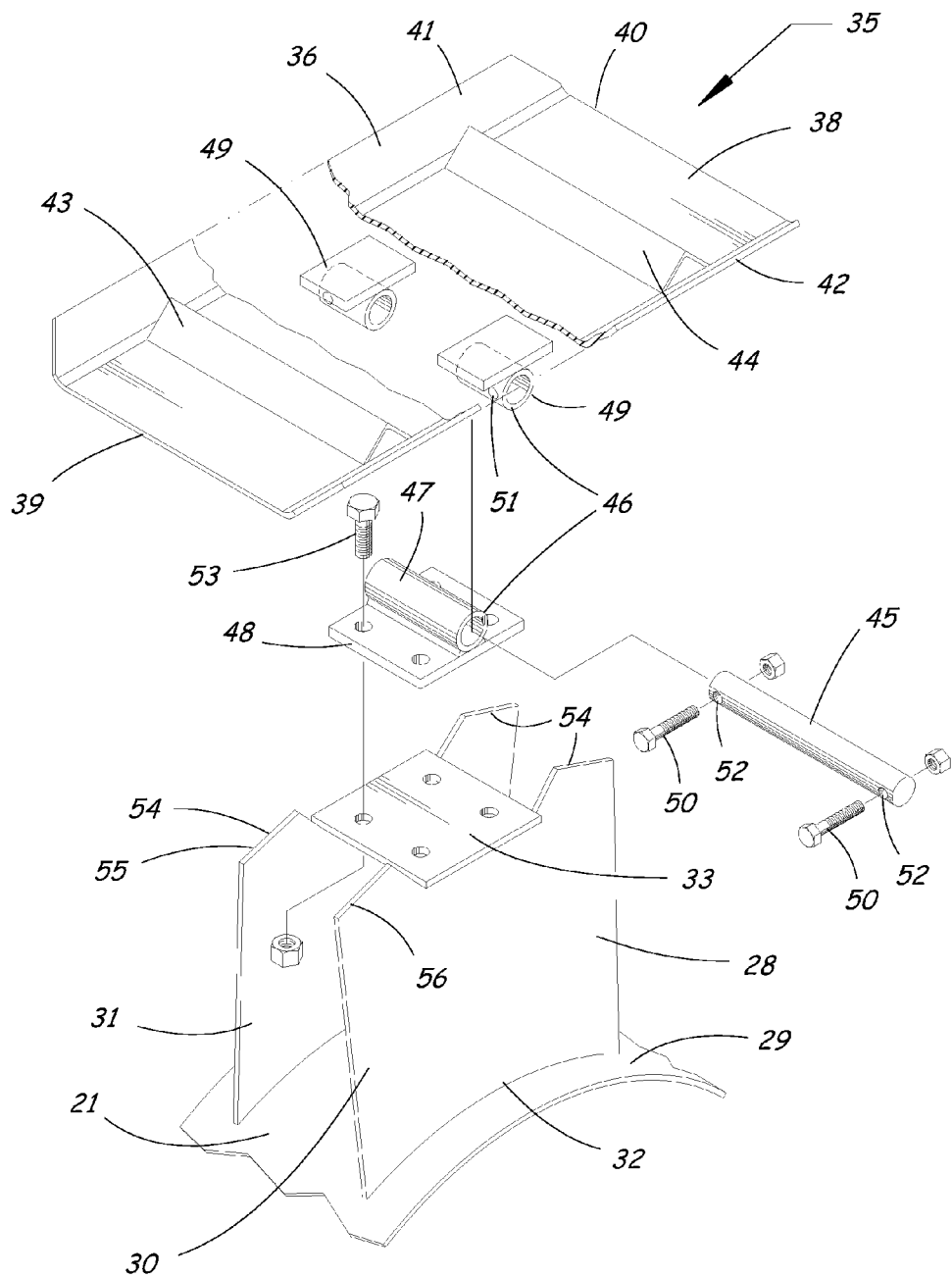
FIG. 4 is an exploded detail view of a radially extending structure and foot assembly of the drive wheel attachment shown in FIG. 3.
Figure 5:
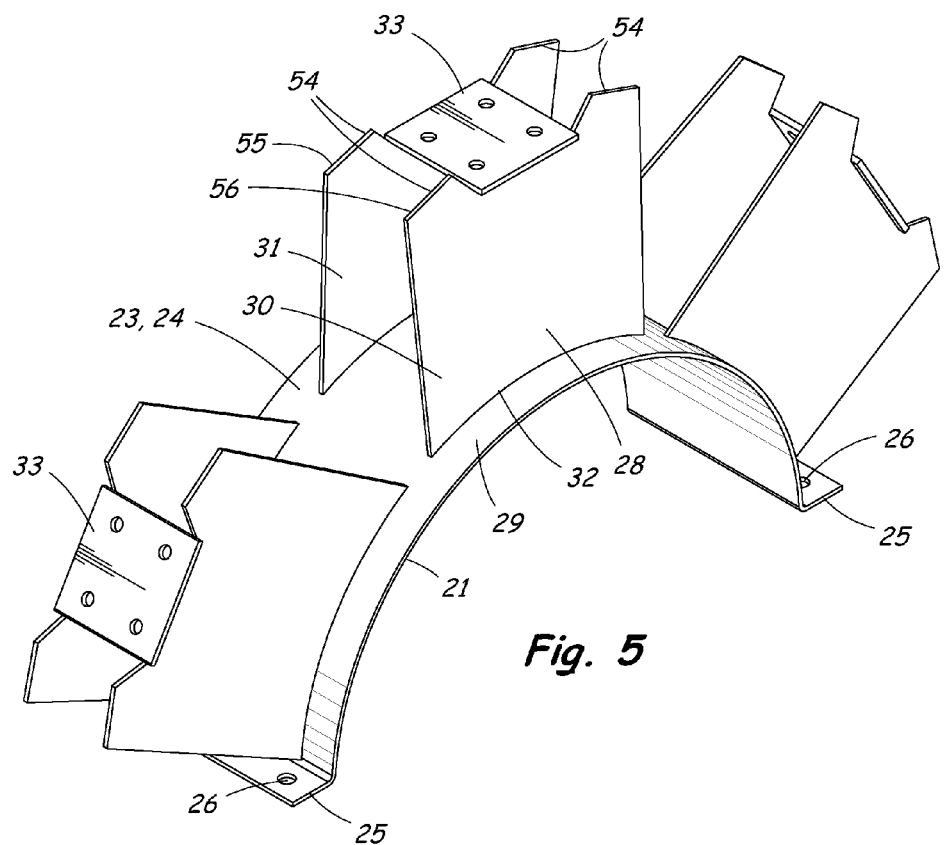
FIG. 5 is a perspective view of a section an annular-shaped clamping band assembly of the drive wheel attachment shown in FIG. 3.
Figure 6:
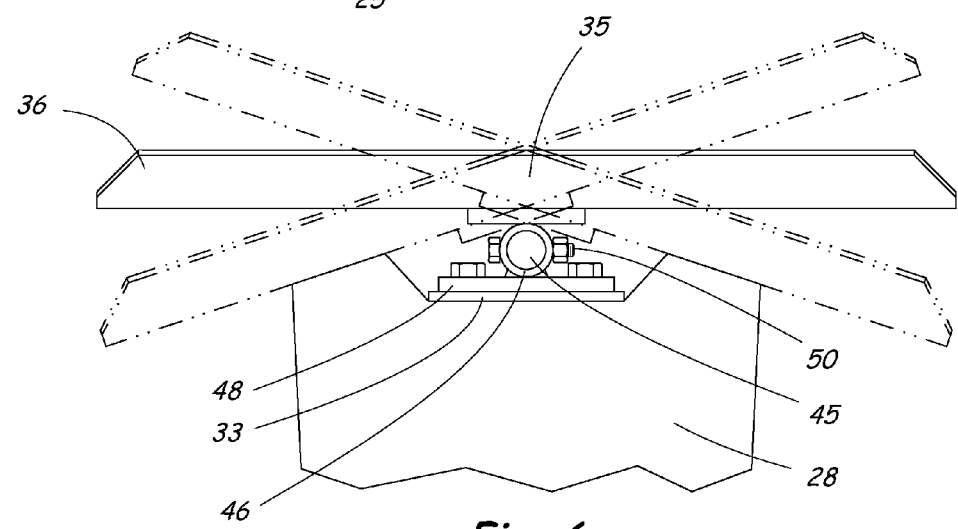
FIG. 6 is a detail view of the foot assembly with its rotated positions shown in phantom lines.
Figure 7:
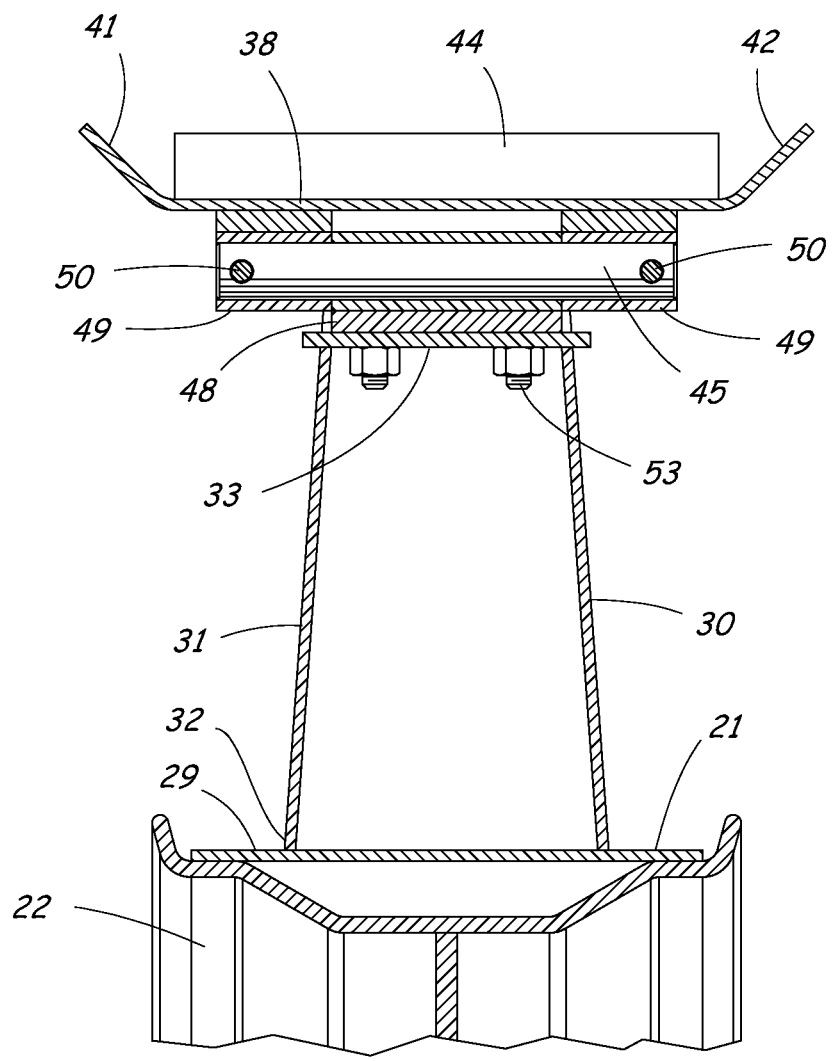
FIG. 7 is a detail cross section view of the drive wheel assembly taken along line 7-7 in FIG. 2.

A plurality of circumferentially spaced, radially extending structures 28 are secured to an outer surface 29 of the clamping band assembly 21 and extend radially outwardly from the clamping band assembly 21. For example, six radially extending structures 28 may be secured to the clamping band assembly 21 at spaced intervals of 60 degrees around the clamping band assembly 21, as illustrated in FIGS. 1 to 3.

The radially extending structures 28 each comprises first and second axially spaced apart, radially extending plate members 30, 31. The plate members 30, 31 each have an inner end 32 secured to the outer surface 29 of the clamping band assembly 21. A first mounting plate 33 is secured to and extends between the outer ends 34 of the plate members 30, 31. The first mounting plate 33 is spaced radially outwardly from the clamping band assembly 21.

A foot assembly 35 is secured to each of the first mounting plates 33 of the radially extending structures 28. For example, six foot assemblies 35 can be secured to the first mounting plates 33 of six radially extending structures 28, respectively, as shown in FIGS. 1 to 3. Each foot assembly 35 includes a pivotally mounted foot pad 36 having an outer surface 37 for engaging the ground as the wheel assembly 16 rotates. The foot pads 36 each have a base portion 38 having a generally rectangular shape with first and second ends 39, 40, first and second angled sides 41, 42, and a plurality of spaced apart tread members 43, 44 extending between the first and second sides 41, 42.

The foot pads 36 are each pivotally attached to a respective one of the first mounting plates 33 by a removable pivot pin 45 and hinge structure 46. The hinge structure 46 includes a first hinge sleeve 47 fixed to a second mounting plate 48, and a pair of second hinge sleeves 49 fixed to a backside of the foot pad 36. The second hinge sleeves 49 are arranged intermediate a length of the foot pad 36 and are axially spaced apart to receive the first hinge sleeve 47 therebetween. The second hinge sleeves 49 are arranged on opposite lateral ends of the first hinge sleeve 47. The pivot pin 45 extends through the first and second hinge sleeves 47, 49. The pivot pin 45 and hinge structure 46 allow rocking movement of the foot pad 36 relative to the radially extending structure 28 about a pivot axis (i.e., the axis of the pivot pin 45) extending in an axial direction of the wheel rim 22.

The pivot pin 45 is fixed relative to the second hinge sleeves 49 by a pin or threaded fastener 50 that extends through aligned holes 51 in at least one of the second hinge sleeves 49 and a corresponding aligned hole 52 in the pivot pin 45. The pivot pin 45 is rotatable relative to the first hinge sleeve 47. By fixing the pivot pin 45 relative to the second hinge sleeves 49 while allowing the pivot pin 45 to rotate within the first hinge sleeve 47, the primary wear points will be concentrated within the first hinge sleeve 47 and the pivot pin 45.

The second mounting plate 48 is removably attached to the first mounting plate 33 using a plurality of threaded fasteners 53. The second mounting plate 48 along with the first hinge sleeve 47 can be easily removed and replaced together with the pivot pin 45 after they reach the end of their initial service life. This allows the primary wear points of the drive wheel assembly 16 to be rebuilt and/or replaced very efficiently and inexpensively.

The first and second plate members 30, 31 each provide a pair of abutment stops 54 on either side of the first mounting plate 33 for engaging and limiting a range of rocking movement of a respective one of the foot pads 36 about its respective pivot axis. Each abutment stop 54 includes a pair of abutment surfaces 55, 56, one on each of the plate members 30, 31. The abutment surfaces 55, 56 extend at an angle that substantially matches the angle of the foot pad 36 when the foot pad 36 engages the abutment surfaces 55, 56.

The drive wheel attachment 20 of the present invention offers a number of advantages over the prior art. The annular shape and two-piece construction of the clamping band assembly 21 allows the attachment 20 to be used on existing wheel rims 22. The primary wear components (i.e., the pivot pin 45 and the first hinge sleeve 47) can be easily removed and replaced to extend a service life of the drive wheel assembly 16. The design of the clamping band assembly 21 and the radially extending structures 28 allow units to be manufactured for different rim sizes while maintaining a uniform outer diameter of the wheel assembly 16 (e.g., the radially extending structures 28 can be made taller for smaller diameter wheel rims 22 to maintain a uniform outer diameter of the wheel assembly 16). The pivot pins 45 can be made of alloy steel to resist wear. The pivot pins 45 can also be removed and rotated 180 degrees relative to the second hinge sleeve 49 to expose a new surface to the wear zone, thereby extending the life of the pivot pins 45.

While the invention has been specifically described in connection with specific embodiments thereof, it is to be understood that this is by way of illustration and not of limitation, and the scope of the appended claims should be construed as broadly as the prior art will permit.

What is claimed is:

1. A drive wheel attachment for a self-propelled irrigation system, comprising:
    an annular-shaped clamping band assembly having multiple sections adapted to fit around a wheel rim, and at least one threaded fastener for drawing together said multiple sections for clamping the clamping band assembly to the wheel rim;
    a plurality of circumferentially spaced, radially extending structures secured to and extending radially outwardly from said clamping band assembly; and
    a plurality of foot pads, each foot pad pivotally attached intermediate its length to a respective one of said radially extending structures for allowing rocking movement of said foot pad relative to said radially extending structure about a pivot axis extending generally parallel to an axial direction of the wheel rim.

2. The drive wheel attachment according to claim 1, wherein said multiple sections of said clamping band assembly comprise first and second sections each having a substantially semi-circular shape with flanges at each end and a plurality of holes formed in said flanges, and said at least one threaded fastener comprises a plurality of threaded fasteners extending through said holes in said flanges to draw said first and second sections together.

3. The drive wheel attachment according to claim 1, wherein said radially extending structures each comprises first and second axially spaced apart, radially extending plate members, said plate members each having an inner end and an outer end, said inner end secured to said clamping band assembly, a mounting plate secured to and extending between said outer ends of said plate members, and a respective one of said foot pads being removably attached to said mounting plate.

4. The drive wheel attachment according to claim 3, wherein said first and second plate members each have abutment surfaces on either side of said mounting plate for engaging and limiting a range of rocking movement of a respective one of said foot pads about its respective pivot axis.

5. The drive wheel attachment according to claim 1, wherein said radially extending structures each comprises a pair of abutment stops for engaging and limiting a range of rocking movement of a respective one of said foot pads about its respective pivot axis.

6. The drive wheel attachment according to claim 1, wherein said foot pads are each pivotally attached to said radially extending structures by a removable pivot pin and hinge structure.

7. The drive wheel attachment according to claim 6, wherein each hinge structure comprises a first hinge sleeve removably attached to an outer end of said radially extending structure.

8. The drive wheel attachment according to claim 7, wherein each hinge structure further comprises a pair of second hinge sleeves attached to a backside of each foot pad, said second hinge sleeves being arranged on opposite axial ends of said first hinge sleeve, and said pivot pin extends through said first hinge sleeve and said second hinge sleeves.

9. The drive wheel attachment according to claim 8, wherein said pivot pin is fixed relative to said second hinge sleeves and rotatable relative to said first hinge sleeve.

10. The drive wheel attachment according to claim 9, wherein each of said radially extending structures comprises a first mounting plate spaced radially outwardly from said clamping band assembly, and said first hinge sleeve is fixed to a second mounting plate which is removably attached to said first mounting plate by a plurality of threaded fasteners.

11. The drive wheel attachment according to claim 1, wherein each of said foot pads comprises a base portion having a generally rectangular shape with first and second ends and first and second sides, and a plurality of spaced apart tread members extending between said first and second sides.

12. A drive wheel attachment for a self-propelled irrigation system, comprising:
    an inner portion;
    a plurality of circumferentially spaced, radially extending structures secured to and extending radially outwardly from said inner portion, said radially extending structures each having an inner end secured to said inner portion and a first mounting plate spaced radially outwardly from said inner portion;
    a plurality of foot assemblies, each foot assembly being attached to a respective one of said radially extending structures, each foot assembly comprising:
        a first hinge sleeve removably attached to a respective one of said first mounting plates;
        a foot pad having an outer surface for engaging the ground and a mounting structure on a backside, said mounting structure comprising a pair of second hinge sleeves arranged intermediate a length of the foot pad, said second hinge sleeves being axially spaced apart to receive said first hinge sleeve therebetween; and a removable pivot pin extending through said first hinge sleeve and said second hinge sleeves that allows rocking movement of said foot pad relative to said radially extending structure about a pivot axis extending in an axial direction of the wheel;

wherein said radially extending structures each comprises first and second axially spaced apart, radially extending plate members, and said first mounting plate is secured to and extends between said plate members.

13. The drive wheel attachment according to claim 12, wherein said first and second plate members each have abutment surfaces on either side of said first mounting plate for engaging and limiting a range of rocking movement of a respective one of said foot pads about its respective pivot axis.

14. A drive wheel attachment for a self-propelled irrigation system, comprising:

an inner portion;

a plurality of circumferentially spaced, radially extending structures secured to and extending radially outwardly from said inner portion, said radially extending structures each having an inner end secured to said inner portion and a first mounting plate spaced radially outwardly from said inner portion;

a plurality of foot assemblies, each foot assembly being attached to a respective one of said radially extending structures, each foot assembly comprising:

a first hinge sleeve removably attached to a respective one of said first mounting plates;

a foot pad having an outer surface for engaging the ground and a mounting structure on a backside, said mounting structure comprising a pair of second hinge sleeves arranged intermediate a length of the foot pad, said second hinge sleeves being axially spaced apart to receive said first hinge sleeve therebetween; and a removable pivot pin extending through said first hinge sleeve and said second hinge sleeves that allows rocking movement of said foot pad relative to said radially extending structure about a pivot axis extending in an axial direction of the wheel;

wherein said pivot pin is fixed relative to said second hinge sleeves and rotatable relative to said first hinge sleeve.

15. A drive wheel attachment for a self-propelled irrigation system, comprising:

an inner portion;

a plurality of circumferentially spaced, radially extending structures secured to and extending radially outwardly from said inner portion, said radially extending structures each having an inner end secured to said inner portion and a first mounting plate spaced radially outwardly from said inner portion;

a plurality of foot assemblies, each foot assembly being attached to a respective one of said radially extending structures, each foot assembly comprising:

a first hinge sleeve removably attached to a respective one of said first mounting plates;

a foot pad having an outer surface for engaging the ground and a mounting structure on a backside, said mounting structure comprising a pair of second hinge sleeves arranged intermediate a length of the foot pad, said second hinge sleeves being axially spaced apart to receive said first hinge sleeve therebetween; and a removable pivot pin extending through said first hinge sleeve and said second hinge sleeves that allows rocking movement of said foot pad relative to said radially extending structure about a pivot axis extending in an axial direction of the wheel;

wherein said first hinge sleeve is fixed to a second mounting plate which is removably attached to said first mounting plate by a plurality of threaded fasteners.

16. A drive wheel attachment for a self-propelled irrigation system, comprising:

an inner portion;

a plurality of circumferentially spaced, radially extending structures secured to and extending radially outwardly from said inner portion, said radially extending structures each having an inner end secured to said inner portion and a first mounting plate spaced radially outwardly from said inner portion;

a plurality of foot assemblies, each foot assembly being attached to a respective one of said radially extending structures, each foot assembly comprising:

a first hinge sleeve removably attached to a respective one of said first mounting plates;

a foot pad having an outer surface for engaging the ground and a mounting structure on a backside, said mounting structure comprising a pair of second hinge sleeves arranged intermediate a length of the foot pad, said second hinge sleeves being axially spaced apart to receive said first hinge sleeve therebetween; and a removable pivot pin extending through said first hinge sleeve and said second hinge sleeves that allows rocking movement of said foot pad relative to said radially extending structure about a pivot axis extending in an axial direction of the wheel;

wherein said inner portion comprises a clamping band assembly having multiple sections adapted to fit around a wheel rim, and at least one threaded fastener for drawing together said multiple sections for clamping the sections to the wheel rim.

17. The drive wheel attachment according to claim 16, wherein each of said foot pads comprises a base portion having a generally rectangular shape with first and second ends and first and second sides, and a plurality of spaced apart tread members extending between said first and second sides.

18. The drive wheel attachment according to claim 16, wherein said plurality of radially extending structures comprises six radially extending structures spaced at 60 degree intervals about said inner portion, and said plurality of foot assemblies comprises six foot assemblies attached to said six radially extending structures, respectively.

19. A drive wheel assembly for a self-propelled irrigation system, comprising:

a wheel rim adapted to be attached to a wheel hub;

an annular-shaped clamping band assembly having multiple sections that fit around the wheel rim, and at least one threaded fastener arranged to draw together said multiple sections to clamp the clamping band assembly to the wheel rim;

a plurality of circumferentially spaced, radially extending structures secured to and extending radially outwardly from said clamping band assembly; and a plurality of foot pads, each foot pad pivotally attached intermediate its length to a respective one of said radially extending structures for allowing rocking movement of said foot pad relative to said radially extending structure about a pivot axis extending generally parallel to an axial direction of the wheel rim.

* * * * *